April 16, 1929.  M. J. POS ET AL  1,709,152
BELT IDLER
Filed July 31, 1926  2 Sheets-Sheet 2

Inventors
MARIUS J. POS,
JOHN J. FAIRBAIRN and
EDWARD S. STADELMAN.
by
Att'ys

Patented Apr. 16, 1929.

1,709,152

UNITED STATES PATENT OFFICE.

MARIUS JULIUS POS, OF EAST ORANGE, AND EDWARD S. STADELMAN, OF NEWARK, NEW JERSEY, AND JOHN JAMES FAIRBAIRN, OF ROOSEVELT, NEW YORK, ASSIGNORS TO ROBINS CONVEYING BELT CO., OF NEW YORK, N. Y., A CORPORATION OF NEW JERSEY.

BELT IDLER.

Application filed July 31, 1926. Serial No. 126,177.

This invention relates to belt idlers and more particularly to supporting means comprising pulleys by which a transverse trough-like shape is imparted to the portion of the belt supported thereby.

An important object of the invention is to provide improved means for mounting the pulleys of said supporting means.

Another object of the invention is to provide improved means for lubricating the supporting means for said pulleys.

A further object of the invention is to provide advantageous means for lubricating the bearings of intermediate pulleys in a set of belt supporting pulleys, from a distant point or points.

Other objects of the invention are to provide pulleys and pulley supports which can readily be assembled and disassembled; pulley-supporting means comprising brackets or standards and devices cooperating with the pulleys and adapted for ready application to and removal from said standards; lubricating means conveniently arranged, and constructed so as to be kept free from dirt and grit; an arrangement consistsing of supports having lubrication conduits associated therewith and pulley-supporting means including members at the ends of said pulleys and adapted to cooperate with said supports, said members having associated therewith lubrication conduits so arranged as to effect a tight fit with the conduits in the supports when said members are placed in cooperative relation with said supports; an arrangement comprising a telescopic connection between lubrication conduits associated with stationary supports and lubrication conduits associated with pulley bearings which are applied to and removed from said supports while in operative relation with such pulleys; and brackets or supports of improved construction.

According to one embodiment of the invention, idler pulleys are mounted in an end-to-end arrangement by suitable roller bearing devices adjacent their ends upon corresponding tubular supports, each of said supports having at its ends bracket blocks adapted to be moved downwardly into seats formed in suitable brackets and to be removed by shifting them in the opposite direction. Lubricating material is supplied through conduits in the bracket blocks to the interior of the hollow tube and passes outwardly therefrom through openings located at the inside of said roller bearings so that lubricant forced outwardly through said openings will pass outwardly through the bearings and will tend to carry all dirt or grit away from the bearings. The brackets are also provided with suitable lubricating passages or conduits and upon placing the bracket block in the seats suitable connections are made for forcing lubricant from a more or less remote point into the supporting tube and to the bearings associated therewith. To give a troughing effect to a belt carried by the idler pulleys, an outer pulley is inclined with reference to the next inner pulley and the seats in the bracket between such pulleys are therefore inclined so as to permit the pulleys to be applied or removed by moving the corresponding bracket blocks at right angles to the normal position of the corresponding pulley. The bracket at the outer end of each outside idler pulley is provided with a seat on the inner face only.

Other objects and advantages will appear upon consideration of the following detailed description and of the drawings, in which.

Figure 1:
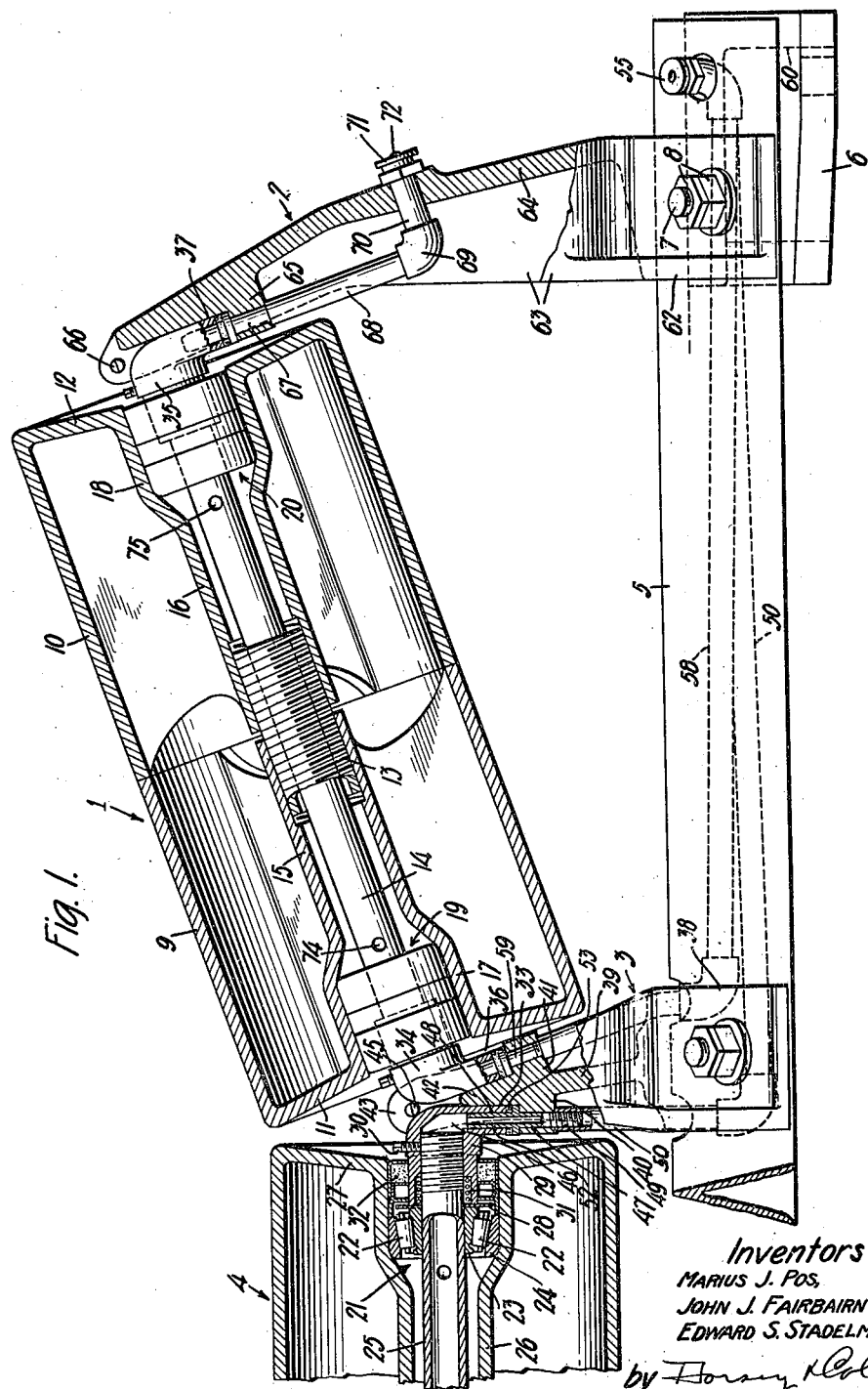
Figure 1 is a sectional view illustrating a preferred embodiment of the invention.

In the illustrated embodiment of the invention, an end idler pulley 1 is mounted at its outer end on an end bracket 2 and at its inner end on the intermediate bracket 3, the bracket 3 also serving to support one end of a second idler pulley 4. Each of the brackets or supports 2 and 3 is formed with a base which has a downwardly facing V-shaped opening and fits over an angular member or idler board 5 which in turn is supported by base members 6 somewhat higher at one side than the other so as to incline the brackets 2 and 3 to some extent. The base of the bracket 2, the angular member 5 and the base or foot 6 may be held together in any suitable manner as by bolts 7 and nuts 8.

The idler pulleys 1 and 4 may be of the same general construction and each may be assembled from sections, idler pulley 1 being shown as comprising sections 9 and 10 having slightly concave heads 11 and 12 respectively. Each of these heads is provided with a central tubular portion or member extending substantially to the inner end of the corresponding section and internally threaded so as to cooperate with an external thread on a sleeve 13 which encloses a tubular member 14 by which the sections 9 and 10 are supported. At their outer ends such inwardly extending tubular members or hubs, which may be designated by 15 and 16 respectively, are formed with enlarged portions 17 and 18 adapted to receive suitable bearings 19 and 20 by means of which sections 9 and 10 are rotatably supported on the tubular member 14.

Each of the bearings 19 and 20 may be of the same construction as the right hand bearing 21 of the idler pulley 4 which comprises rollers 22 and suitable devices 23 and 24 cooperating with the rollers 22 and, respectively, with an axial tubular support or member 25 and the tubular member 26 extending inwardly from the right hand head 27 of the idler pulley 4. As indicated in Figure 1, the member or device 24 is held against leftward movement by engagement with the end of the reduced portion of the tubular member 26 and the member 23 is held against outward movement by a member 28 and, at the outer side of the latter, a bracket block 29 threaded on the outer end of the tubular member 25 and held against turning movement by means of a set screw 30. Near its left hand end the bracket block 29 is cut away so as to receive a spring 31 which tends to press the member 28 against the member 23, and assists in rendering the adjustment more nearly fool proof.

As will be brought out more clearly hereinafter, lubricating material introduced to the inside of tubular member 25 is forced outwardly past the rollers 22, and to prevent the entry of dust and undesirable material, a suitable annular device or grease seal 32 comprising a washer and suitable cups is mounted on the tubular inwardly extending portion of the block 29. The outer end of the bracket block 29 is tapered slightly at its sides to give a wedgelike effect, and when lowered into position fits closely in a seat 33 in the bracket 3. In the same manner the tubular support 14 of the idler pulley 1 is attached at its ends to bracket blocks or members 34 and 35 respectively, the left hand bracket block 34 resting in a seat 36 in the bracket 3 and the right hand bracket block 35 resting in a seat 37 at the left side of the end bracket 2.

Figure 3:
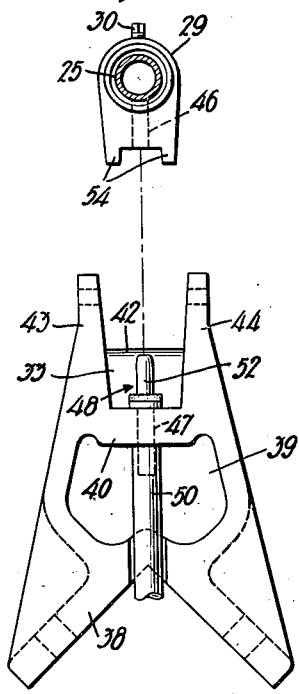
Figure 3 is an end view illustrating the left hand bracket in Figure 1 and the corresponding left hand bracket block therefor separated therefrom.

As illustrated in Figs. 1 and 3, the bracket 3 comprises a base 38, a central web 39, a flange 40 providing a base for the seat 33, a flange 41 providing a base for the seat 36, a wedge-shaped portion 42 between the seats 33 and 36, and edge flanges 43 and 44 diverging upwardly from the flanges 40 and 41 to receive the tapered portions of the blocks 29 and 34. These edge flanges 43 and 44 are extended upwardly above the upper edge of the wedge-shaped portion 42 and are perforated to receive a cotter pin 45 in such a position (Fig. 1) as to prevent removal of either of the bracket blocks or members 29 and 34. It will be apparent that the relation of the central web 39 to the base 38 of the bracket 3 is such that accumulation of dust and waste material at the sides of the bracket may be avoided.

The flat portion of the bracket block 29 is provided with a lubricating passage 46 communicating at its upper end with the inside of the tubular support on member 25, extending to the lower edge of the block, and being in alignment with an opening 47 in the flange 40 when the block is lowered into the seat 33. Lubricating material is fed to the passage 46 through a hollow stud 48 comprising a lower portion 49 threaded into the upper end of a pipe or conduit 50, a flange or enlarged portion 51 to rest on the top of the flange 40 and an upper portion or stud proper 52 to fit into the passage 46. Preferably a washer 53 of suitable material is placed over the upper portion 52 of the hollow stud 48 and tends to give a tight seal between the lower end of the bracket block 29 and the flange or enlarged portion 51 of the hollow stud. Preferably the washer 53 is of felt and is applied with shellac.

In order to provide for a uniform positioning of the block 29 above the flange 40, provision may be made of suitable means such as lugs 54 on the block 29 and spaced to permit them to contact with the top of the flange 40 at opposite sides of the washer 53 and flange 51. As herein disclosed, the conduit 50 extends downwardly through openings in the base 38 of the bracket 3 and corresponding openings in the angle member 5 and forwardly beyond the bracket or support 2 where it is turned upwardly through the angle member 5 and provided with a tip 55 adapted for use with an Alemite gun or the like. As indicated the tip 55 is normally sealed by means including a ball 56. Obviously the conduit 50 may be made up of a plurality of pipe lengths attached together by elbows or other uniting means.

Figure 2:
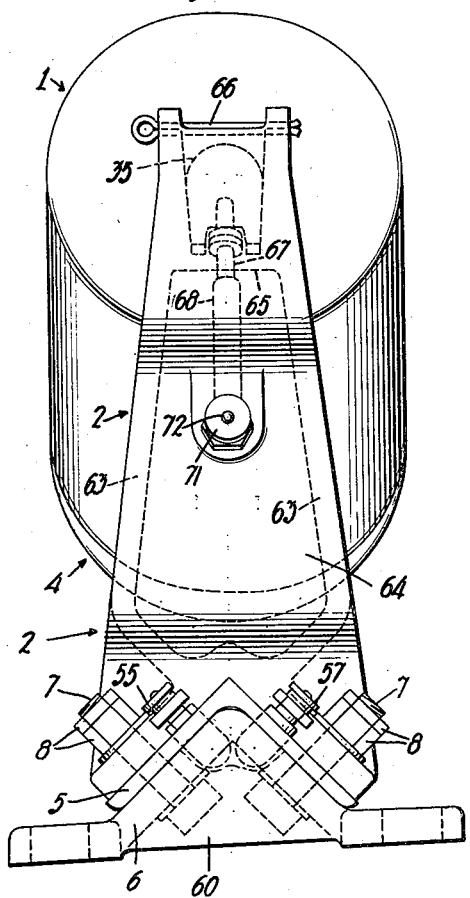
Figure 2 is an end view of the apparatus shown in Figure 1.

The means for supplying lubricating material to the left hand end of the tubular member 14 carrying the idler pulley 1, may be similar to that just described in connection with the tubular member 25 supporting the idler pulley 4. For example, the lubricant may be forced into a tip 57 projecting upwardly through an opening in the member 5 at the outer side of the bracket 2, and through a conduit or pipe line 58 extending under the angle member 5 and upwardly through openings in the member 5 and in the base of the bracket 3, to the lower side of the flange 41, at which point it is connected with a hollow stud 59, which in turn is connected by means of a passage in the bracket block 34 with the tubular member 14. The base 6 carrying the angular member 5 is closed at its front end (Fig. 2) by a web 60 and from a point slightly to the rear of said web is so formed as to accommodate the conduits or pipes 50 and 58, and also to provide supports 61 therefor.

Preferably the bracket 2 comprises a base portion 62, side flanges 63 and an inclined web 64 joining the flanges 63 at their outer edges and serving to a great extent to eliminate places in which dust and waste may collect. It should be noted also that the upper surface of the base portion 62 is inclined downwardly away from the web 64 so that any dust or waste material collecting at the rear of the web may be removed easily. It will be seen that the seat 37 is provided with a base by a flange 65, with side walls by extensions of the side flanges 63, and with a rear wall by an extension of the web 64. The bracket block 35 may be held in the seat 37 by any suitable means such as a cotter pin 66.

It has also been found desirable to supply lubricating material directly to the upper end of said tubular member 14, through the bracket block 35. This result may be obtained by connecting the member 14 through the bracket block 35, a hollow stud 67 seated in the flange 65, a pipe or tube 68 connected with said hollow stud, an elbow 69, and a tube 70 passing through the web 65, with a tip 71 for use with an Alemite gun or the like and of larger diameter than the width of the opening in the web 64. This tip is, like the similar tips previously described, provided with sealing means including a ball 72.

Although the sections 9 and 10 of the idler 1 may be constructed in different ways, it is preferable to form them with ribs 73, radial or otherwise, extending substantially the length of each section and outwardly from the tubular members or hubs 15 and 16 to the outer shells of said sections. Although the passage of the lubricant from the interior of the tubular supports for the idlers may be arranged in different ways, it is deemed preferable in the present case to provide openings near the opposite ends of each pulley but at the inner sides of the bearings. For example, the tubular member 14 carrying the idler pulley 1 is illustrated as having openings 74 and 75.

The invention has been disclosed more particularly with reference to an arrangement in which there is a central idler pulley and a pulley at each side thereof with its axis inclined with reference to the axis of the central idler. It should be understood, however, that the invention is of such scope as to apply to arrangements in which there are different numbers of idler pulleys and to arrangements in which the relative positions of the axes are different, or for example an arrangement in which some or all of the axes are in alignment.

It will be seen that the bearings, springs and supporting tubes associated with each pulley, are kept in assembly by the so-called bracket blocks which screw onto the ends of the tube and are kept in position by set screws so that the projecting parts of the bracket blocks always point in the same direction. Such assembly should be set up in a fixture so as to produce the proper spacing between the pulley blocks at the ends of a pulley assembly and render such pulley assemblies interchangeable. Furthermore, the studs projecting upwardly from the bases of the seats on the brackets serve as locating members for the bracket blocks or tube supports.

Other advantageous features are the arrangement of dead shafts or supports for the pulleys secured to bearing blocks in such a manner as to permit endwise adjustment of the latter; the securing in alignment of bearing blocks at opposite ends of a pulley; the capability of removal and insertion of pulleys without disrupting lubricating connections for pulley bearing; protection of lubricating devices from injury due to displacement of moving parts or to falling material; and the projection of portions of tube supports or bracket blocks through grease seals contained in the pulleys.

The foregoing detailed description has been given for clearness of understanding, and no undue limitation should be deduced therefrom, but the appended claims should be construed as broadly as possible, in view of the prior art.

Having thus described our invention, we claim:

1. In supporting means for a belt, a pulley, a bracket block on which the pulley is rotatably mounted and having a lubricating conduit leading to the lower side thereof, a bracket having a seat into which said bracket block fits when lowered into position and having a lubrication conduit extending to the lower part of said seat and adapted to have a close connection with the conduit of said bracket block, and means for supplying lubricant including a conduit extending to the lower part of said seat and having a close connection with the conduit of said bracket block when the latter is lowered into position.

2. In a supporting means for a belt, a pulley, a member upon which said pulley is rotatably mounted and having a lubrication conduit extending from the outer end thereof inwardly to lubricate the connection between said pulley and the supporting member therefor, a bracket block attached to such end of said member and having a lubrication conduit communicating with the lubrication conduit in said member and extending to the lower side of the bracket block, and a bracket having a seat into which said bracket block fits when lowered into position and having a lubrication conduit extending to the lower part of said seat and having a close connection with the conduit of said bracket block when the latter is lowered into position.

3. In supporting means for a belt, a pulley, a tube on which the pulley is rotatably mounted and which is perforated to permit lubricant to flow outwardly therefrom and lubricate the mounting of said pulley on the tube, a bracket block attached to one end of said tube and having a lubrication conduit communicating with the interior of the tube and leading to the lower side of the bracket block, and a bracket having a seat into which said bracket block fits when lowered into position and a lubrication conduit extending to the lower part of said seat and having a tight connection with the conduit of said bracket block when the latter is lowered into position.

4. In supporting means for a belt, a pulley, a bracket block on which the pulley is rotatably mounted and having a lubrication conduit leading to a surface thereof other than the surface on the side towards the pulley, a bracket having a seat into which said bracket block fits when moved into position and having a lubricating conduit adapted to have a telescopic connection with the conduit of said bracket block, and means for supplying lubricant from a distance to the conduit in said bracket block.

5. In supporting means for a belt, a pulley, a bracket block on which the pulley is rotatably mounted and having a lubrication conduit leading to the outer part thereof and having a downwardly facing end, a bracket having a seat into which said bracket block fits when lowered into position, a conduit associated with said bracket and having a telescopic connection with the conduit of said bracket block, and means for supplying lubricant from a distance to the conduit in the bracket block.

6. In supporting means for a belt, a pulley, a bracket block on which the pulley is rotatably supported and having a lubrication conduit leading to the lower side thereof, a bracket having a seat into which said bracket block may be lowered, and means for supplying lubricant from a distant point comprising a conduit, means for connecting the last mentioned conduit with said bracket and including a hollow member adapted to have a telescopic connection with the conduit of said bracket block and communicating with the interior of the other of said conduits.

7. In supporting means for a belt, a pulley, a bracket block on which said pulley is rotatably mounted and having a lubrication conduit leading outwardly from said pulley and with its inlet extending at right angles to the axis of said pulley, a bracket having a seat into which said bracket block may be inserted in a direction at right angles to the axis of said pulley and with said inlet facing in such direction, a conduit associated with said bracket and adapted to have a telescopic connection with said inlet when the bracket block is inserted in said seat, and means for supplying lubricant from a distant point to the conduit associated with said bracket.

8. In apparatus of the class described, a pulley, a bracket block on which said pulley is rotatably mounted and having a lubrication conduit extending outwardly from said pulley and leading to the lower side of the bracket block, a bracket having a bracket block seat with a base having an opening therein, a lubrication conduit adjacent said opening, and a hollow stud having a portion cooperating with said base to furnish support for the stud, a downwardly extending portion attachable to the end of the conduit associated with the bracket, and having an upwardly projecting portion to enter the end of the conduit in the bracket block when the latter is inserted in the seat.

9. In apparatus of the class described, a pulley, a bracket block member on which the pulley is rotatably mounted, a bracket member having a seat into which said bracket block fits, and lubricating means including a conduit ending at a stud at one of said members and a conduit ending in a socket at the other of said members, said stud and said socket being so arranged as to make a close fitting connection when said bracket block member is placed in said seat.

10. In apparatus of the class described, a pulley, a bracket block on which said pulley is rotatably mounted, a bracket having a seat into which said block fits, a downwardly concave base portion on which said bracket is supported, and lubricating means including a conduit ending in a socket at said bracket block and a conduit ending at the bracket in a stud to fit into said socket and extending beneath said base to a distant point.

11. In apparatus of the class described, a bracket having at one side thereof a seat with a base having an opening therein; a lubrication conduit supported adjacent said opening; a hollow stud for said seat having a portion attachable to said conduit, an enlarged portion overlying the base of such seat and a projecting portion; a washer resting on the enlarged portion of said stud; a bracket block insertable into said seat from above and having an opening to receive the projecting portion of said stud, a portion around said stud to engage said washer, and lugs on opposite sides of said washer to engage the base of said seat and definitely fix the position of said bracket block; and a pulley rotatably mounted on said bracket block.

12. In apparatus of the class described, a bracket block having therein a lubrication conduit with an inlet at the lower side of the block, a bracket having at one side thereof a seat adapted to receive said block from above, a hollow stud projecting from said seat for insertion into said inlet to supply lubricant thereto, a washer surrounding said stud to seal the joint between said stud and said block, a pulley, and means lubricated through the conduit in said bracket block, for rotatably supporting said pulley on said bracket block.

13. In apparatus of the class described, a pulley, a bracket block on which said pulley is rotatably mounted and having therein a lubrication conduit with an inlet at the lower side of the block, a bracket having at one side thereof a seat adapted to receive said block from above, a hollow stud projecting from said seat for insertion into said inlet to supply lubricant thereto, a washer surrounding said stud to seal the joint between said stud and said block, and means to determine definitely the position of said bracket block relative to the bottom of said seat.

14. In supporting means for a belt, an idler pulley comprising two hollow sections each having a head and projecting inwardly from said head, a tubular hub having a section of greater internal diameter at its outer end, bearings in said sections of greater diameter, a supporting member extending through said bearings, means, including bracket blocks threaded on the ends of said supporting member, to hold the bearings in position, and brackets having parallel seats into which said bracket blocks, assembled with the idler pulley, may be inserted by movement in a direction perpendicular to the axis of the pulley.

15. In supporting means for a belt, an idler pulley comprising two hollow sections each having a head and projecting inwardly from said head, a tubular hub having a section of greater internal diameter at its outer end, bearings in said sections of greater diameter, a supporting member extending through said bearings, means, including bracket blocks threaded on the ends of said supporting member and springs interposed between the bracket blocks and the bearings, to hold the bearings in position, and brackets having parallel seats into which said bracket blocks assembled with the idler pulley may be inserted by movement in a direction perpendicular to the axis of the pulley, said seats being constructed to support said blocks against end thrust.

16. In supporting means for a belt, an idler pulley comprising heads and inwardly projecting tubular hubs having sections of greater internal diameter at their outer ends, roller bearings located at the inner ends of said sections of greater internal diameter, annular lubricant seals located at the outer sides of said bearings, a supporting member extending through said bearings and constructed to admit lubricant from the outer ends thereof between the bearings, and bearing blocks threaded on the ends of said supporting member and having inwardly extending round parts passing through said lubricant seals and fitting in the same.

17. In supporting means for a belt, a plurality of idler pulleys in end-to-end arrangement, bracket blocks on which said pulleys are rotatably mounted, means including an end bracket and an intermediate bracket having seats in which said bracket blocks rest, a base on which said brackets are mounted, and means for supplying lubricant to the blocks comprising means for conducting the lubricant from a position adjacent the end bracket beneath the base and up along the intermediate bracket to the seats thereon, the connection between the seats and the blocks being such that a close lubrication connection is effected when said blocks are placed in the seats, and such connection is broken simply by removing the bracket blocks.

Signed at New York, N. Y., this 30th day of July, 1926.

MARIUS JULIUS POS.
EDWARD S. STADELMAN.
JOHN JAMES FAIRBAIRN.